United States Patent [19]
St. Clair et al.

[11] Patent Number: 4,837,300
[45] Date of Patent: Jun. 6, 1989

[54] COPOLYIMIDE WITH A COMBINATION OF FLEXIBILIZING GROUPS

[75] Inventors: Terry L. St. Clair, Poquoson; Harold D. Burks, Newport News; Donald J. Progar, Grafton, all of Va.

[73] Assignee: The United States of America as represented by the Administration of the National Aeronautics and Space Administration, Washington, D.C.

[21] Appl. No.: 71,686

[22] Filed: Jul. 9, 1987

Related U.S. Application Data

[63] Continuation-in-part of Ser. No. 746,901, Jun. 20, 1985, abandoned.

[51] Int. Cl.$^4$ .............................................. C08G 73/10
[52] U.S. Cl. ..................... 528/353; 524/233;
524/366; 524/378; 524/600; 524/607; 528/125;
528/126; 528/128; 528/173; 528/179; 528/182;
528/185; 528/188; 528/220; 528/229; 528/351;
528/352
[58] Field of Search ............... 528/353, 125, 126, 128,
528/173, 179, 182, 185, 188, 220, 229, 351, 352;
524/233, 366, 378, 600, 607

[56] References Cited

U.S. PATENT DOCUMENTS

| | | | |
|---|---|---|---|
| 3,422,061 | 1/1969 | Gall et al. | 260/47 |
| 3,563,951 | 2/1971 | Dormagen et al. | 260/47 |
| 3,639,343 | 2/1972 | Chung-Chi Su et al. | 260/47 |
| 3,705,870 | 12/1972 | Darmory et al. | 260/30.2 R |
| 3,870,677 | 3/1975 | Farrissey Jr. et al. | 260/371 V |
| 3,933,745 | 1/1976 | Bargain et al. | 260/47 CP |
| 3,933,749 | 1/1976 | William III | 260/47 CP |
| 4,331,799 | 5/1982 | Holub et al. | 528/185 |
| 4,332,929 | 6/1982 | Holub et al. | 528/185 |
| 4,438,256 | 3/1984 | Ohta et al. | 528/188 |
| 4,443,592 | 4/1984 | Schmidt et al. | 528/128 |
| 4,725,642 | 2/1988 | Gannett et al. | 528/353 |

Primary Examiner—Harold D. Anderson
Attorney, Agent, or Firm—George F. Helfrich; John R. Manning; Charles E. B. Glenn

[57] ABSTRACT

Novel copolyimides are prepared by reacting one or more aromatic dianhydrides with a meta-substituted phenylene diamine and an aromatic bridged diamine. The incorporation of meta-substituted phenylene diamine derived units and bridged aromatic diamine derived units into the linear aromatic polymer backbone results in a copolyimide of improved flexibility, processability, and melt-flow characteristics. The novel copolyimides are especially useful as thermoplastic hot-melt adhesives.

12 Claims, No Drawings

COPOLYIMIDE WITH A COMBINATION OF FLEXIBILIZING GROUPS

This application is a continuation-in-part application of serial number 746,901, filed June 20, 1985, now abandoned.

ORIGIN OF THE INVENTION

The invention described herein was made by employees of the United State Government and may be manufactured and used by or for the Government for governmental purposes without the payment of any royalties thereon or therefor.

BACKGROUND OF THE INVENTION

This invention relates to novel copolyimides in general and more particularly to novel copolyimides derived from the reaction of one or more aromatic dianhydrides with a meta-substituted phenylene diamine and a bridged aromatic diamine. The incorporation of the meta-substituted phenylene diamine derived units and bridged aromatic diamine derived units into the linear aromatic polymer backbone results in a copolyimide of improved flexibility, processability and melt-flow characteristics.

Aromatic polyimides are generally difficult to process because they exhibit only a limited degree of flow even at high temperatures and when subjected to high pressure. These materials are, however, exceptionally thermally stable and resist attack by most solvents. Additionally, they generally have very high glass transition temperatures because of their aromatic character. Because of desirable properties such as resistance to solvents and the high glass transition temperature, many attempts have been made to prepare aromatic polyimides which can be easily processed.

Prior art attempts such a solution by incorporation sulfur linkages into a polyimide backbone. Another teaching is the use of particulated oligomeric polyetheramide acids which may be converted to a high molecular weight polymer system by melt polymerization. Another discloses the use of varied proportions of different polyetherimide segments in an attempt to reach the optimum balance between processability and solvent resistance. Another teaching is that certain polyetherimides can be prepared which can be reinforced with various fillers to form composites. Prior art further teaches that the incorporation of flexible moieties into the backbone of a polyimide can increase thermoplastic character, and that the incorporation of phenylene ether units into polyimides can improve melt-flow properties. Even though all of the above prior art systems have contributed in various ways to improving the processability of linear aromatic polyimides, there is still a definite need in the art for enhanced melt-flow properties in polyimides in order that they may be used for applications such as hot-melt adhesives or as matrix resins for fiber-reinforced composites.

Accordingly, an object of the present invention is to provide polyimides with improved flow properties.

Another object of the invention is to provide polyimides with high glass transition temperatures and which soften to a high degree above their glass transition temperatures.

Yet another object of the invention is to provide polyimides with resistance to solvents.

A further object of the invention is to provide polyimides which can be solvent or hot-melt coated onto fibers for preparation of composites.

Another object of the invention is to provide polyimides which can be used as hot-melt adhesives.

Still another object of the invention is to provide polyimides which have low melt viscosities.

Another object of the invention is to provide polyimides which become more planar when exposed to temperatures above their glass transition temperature.

Still another object of the invention is to provide a process for making polyimides of enhanced melt-flow characteristics.

A further object of the invention is to provide a process for using the polyimides of the invention as hot-melt adhesives for bonding materials together by surface attachment.

SUMMARY OF THE INVENTION

According to the present invention, the foregoing and other objects are achieved by incorporating the proper mix of flexibilizing units into the backbone of a linear aromatic polyimide. The flexible units independently have been shown by others to enhance thermoplastic character in polyimides, however, in the present invention the proper incorporation of the prepreg combinations of these units leads to unexpected synergistic improvements in softening, thermoplastic and flow behavior of the resulting polymers.

DETAILED DESCRIPTION OF THE INVENTION

The polymer with improved softening, thermoplastic and flow behavior consists essentially of chemically combined recurring units of the formulas:

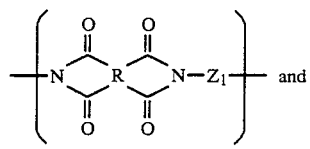 and

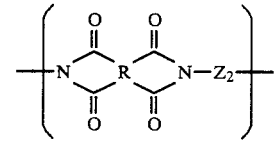

wherein R may differ between the recurring units and is an aromatic tetravalent radical; and wherein $Z_1$ is a bridged radical of the formula:

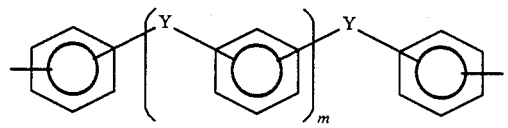

where Y may differ within the radical and is selected from the group consisting of —O—, —S—, —CO—, —SO$_2$—, —NH—, —SO—,

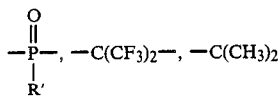

where R' is alkyl or aryl and m is 0, 1, 2, or 3; and wherein $Z_2$ is of the formula:

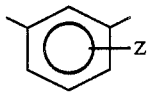

where Z is selected from the group consisting of —Br—, Cl, —F—, —CF$_3$—, —aryl—, —alkyl, and hydrogen.

Suitable R's include:

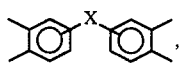

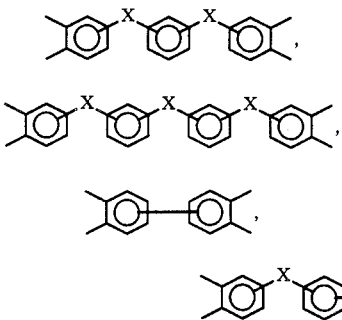

wherein X may differ within the R radical and is selected from the group consisting of —O—, —S—, —CO—, SO$_2$—, —NH—, —SO—, —C(CF$_3$)$_2$—, —C(CH$_3$)$_2$—, and

where R' is alkyl or aryl, as well as others that would be obvious to those skilled in the art.

Suitable bridged radicals include:

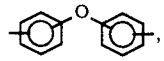

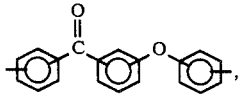

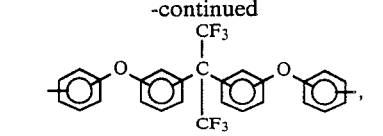

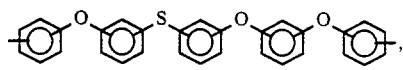

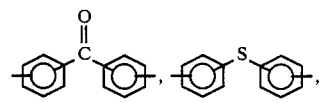

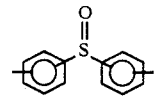

as well as others that would be obvious to those skilled in the art.

Examples of the $Z_2$ radicals are:

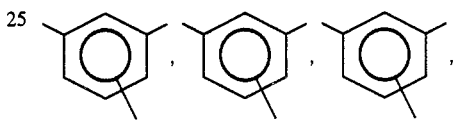

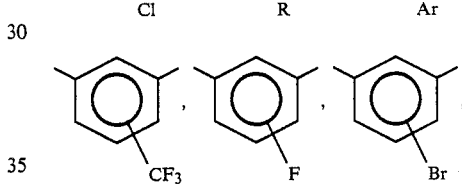

wherein R=alkyl and Ar=aryl. A special case is also made for polyimides of the following structure:

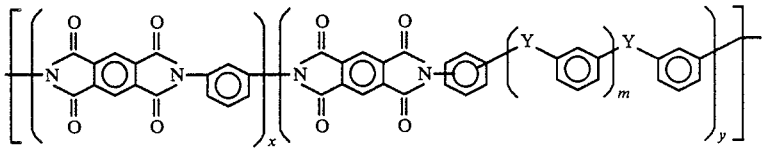

wherein y and m are as defined above and x and y are at least equal to one and are positive whole numbers.

Representative polymers were prepared according to the present invention by dissolving the appropriate dianhydrides and diamines in solvents such as N,N-dimethylacetamide (DMAc), N-methylpyrrolidone (NMP), N,N-dimethylformamide (DMF), and bis(2-methoxyethyl)ether. Other solvents such as tetrahydrofuran, dioxane, dimethylsulfoxide as well as others obvious to those skilled in the art could be used.

After the polymerization occurred in the particular solvent the resulting poly(amide-acid) was precipitated in a non-solvent such as water, an alcohol, or a hydrocarbon. The precipitated poly(amide-acid) was then filtered from the solution, dried at a temperature of 20°–30° C. for ten to fifteen hours, and heated in an oven for approximately one hour at about 300° C. Chemical imidization would also be appropriate utilizing dehydrating agents such as acetic anhydride in pyridine, propionic anhydride in pyridine, butyric anhydride in pyridine, trifluoroacetic acid in pyridine, dicyclohexylcarbodiimide, or others obvious to those skilled in the art. The conversion of the poly(amide-acid) to the corresponding isoimide should appropriately be between 5 and 100%.

Copolyimides were prepared using three dianhydrides. The structure of these copolyimides are as follows:

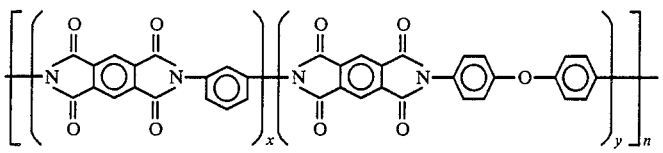

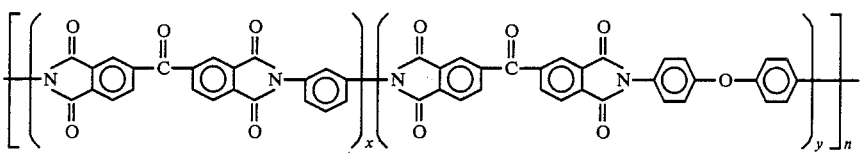

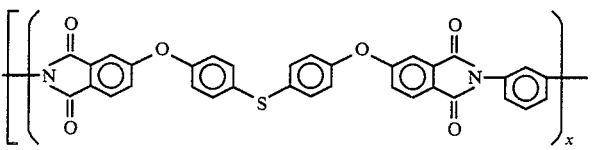

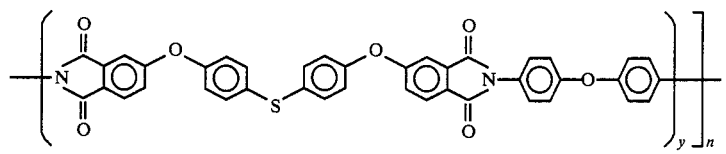

where x:y=1:1 and n is between 5 and 100.

In these three cases, films were prepared from the polymers by applying a 0.15 inch coating of the poly(amide-acid) jin DMAc onto a piece of plate glass, evaporating the solvent and heating the film for approximately one hour at about 100°C., then for approximately one hour at about 200°C., and then for approximately one hour at about 300°C. After removal of the films from the glass, they all exhibited a smoother, more uniform surface than the corresponding polymer films where the ratio x:y is 1:0 or 0:1. In order to more quantitatively assess the effect of using these two flexibilizing groups in conjunction with each other a series of copolyimides of the following compositions were prepared in DMAc and thermally converted to the imide.

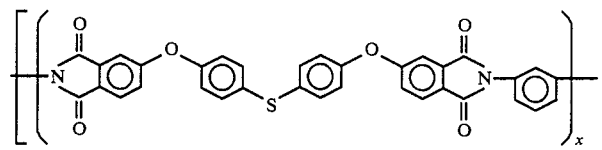

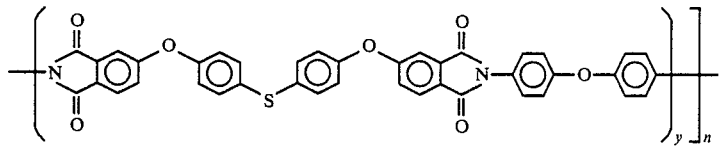

where y:x was 1:3, 2:2 and 3:1, and where n was 5-100. The polymer designation (Tables I-V) for the 3:1 structural formula is 431, that for the 2:2 structural formula is 422, and the designation for the 1:3 structure is 413.

In the case where x=0, this polymer is designated BDSDA/4,4'-ODA, and where y=0, this polymer is designated BDSDA/m-PDA. Another polymer of the following structure with the designation BDSDA/3,3'-ODA was prepared for comparison:

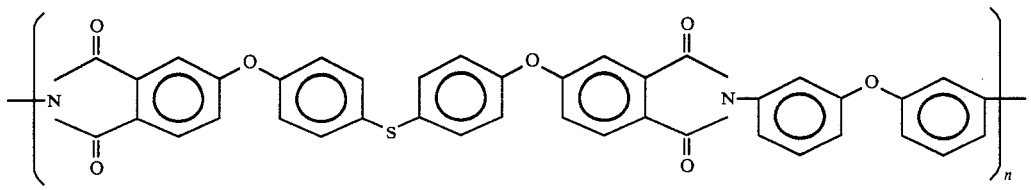

The glass transition temperatures of these polymers are shown in Table I.

TABLE I

| POLYMER | COPOLYMER MOLAR RATIO y:x | GLASS TRANSITION TEMPERATURE $T_g$, °C |
|---|---|---|
| BDSDA/m-PDA | 0:4 | 224 |
| 413 | 1:3 | 220 |
| 422 | 2:2 | 216 |
| 431 | 3:1 | 217 |
| BDSDA/4,4'-ODA | 4:0 | 217 |
| BDSDA/3,3'-ODA | — | 196 |

The rheological properties of the polymers were evaluated using a capilliary rheometer. This technique allows one to quantify melt viscosity as a function of strain rate using a mechanical screw-driven extruder. The data presented for viscosity are shown as apparent viscosity because no correction was made for wall friction in the capillary. Therefore all data are relative and not absolute.

The two polymers, BDSDA/m-PDA and BDSDA/4,4'-ODA, were run as extremes in comparison for the three copolymers, 413, 422, and 431. The BDSDA/3,3'-ODA was prepared as an example of a similar polymer with two types of flexibility in the diamine unit. Attempts to extrude the BDSDA/4,4'-ODA through the capillary were unsuccessful because it would not flow within the capability limits of the rheometer ($5 \times 10^6$ Pa-sec). Comparative data for all of the systems are shown in Table II (all runs were made at 350°C.).

TABLE II

| Polymer | Strain Rate, sec$^{-1}$ | Apparent Viscosity, Pa-sec |
|---|---|---|
| BDSDA/4,4'-ODA | 0.404 | No Flow |
| BDSDA/m-PDA | 0.404 | $2.10 \times 10^5$ |
| BDSDA/3,3'-ODA | 0.404 | $7.95 \times 10^5$ |
| 413 | 0.404 | $3.04 \times 10^5$ |
| 422 | 0.404 | $1.50 \times 10^5$ |
| 431 | 0.404 | $2.62 \times 10^5$ |

The smaller the apparent viscosity number the greater is the ease of flow. From this Table, it is clear that the 422 system has the lowest viscosity.

This test was also performed at a higher strain rate of 13.456 sec$^{-1}$ and this data is shown in Table III (350°).

TABLE III

| Polymer | Strain Rate, sec$^{-1}$ | Apparent Viscosity, Pa-sec |
|---|---|---|
| BDSDA/4,4'-ODA | 13.456 | No Flow |
| BDSDA/m-PDA | 13.456 | $0.323 \times 10^5$ |
| BDSDA/3,3'-ODA | 13.456 | $0.669 \times 10^5$ |
| 413 | 13.456 | $0.346 \times 10^5$ |
| 422 | 13.456 | $0.227 \times 10^5$ |
| 431 | 13.456 | $0.338 \times 10^5$ |

Again, the 422 system has the lowest viscosity of all the systems.

The highest strain rate of which the rheometer was capable was investigated for these same polymers to see if this trend held. This data is in Table IV (350°C.).

TABLE IV

| Polymer | Strain Rate, sec$^{-1}$ | Apparent Viscosity, Pa-sec |
|---|---|---|
| BDSDA/4,4'-ODA | 134.560 | No Flow |
| BDSDA/m-PDA | 134.560 | $0.109 \times 10^5$ |
| BDSDA/3,3'-ODA | 134.560 | $0.134 \times 10^5$ |
| 413 | 134.560 | $0.107 \times 10^5$ |
| 422 | 134.560 | $0.079 \times 10^5$ |
| 431 | 134.560 | $0.085 \times 10^5$ |

Again even at this highest strain rate (134.56 sec$^{-1}$) the 422 polymer exhibited the lowest viscosity. It was quite surprising that in each case the BDSDA/3,3'-ODA exhibited the highest viscosity since this system has flexibility due to the oxygen bridging group as well as the added flexibility introduced through the meta-linkages. However, in each case this polymer was extrudable where the corresponding BDSDA/4,4'-ODA with only one flexibilizer was not.

The key feature illustrated in these Tables is that the 422 copolymer always exhibits the lowest viscosity and all of the copolymers (413, 422 and 431) flow through the capillary whereas the BDSDA/4,4'-ODA does not. In addition the 422 copolymer exhibits a lower viscosity in each case than does the BDSDA/m-PDA. This data proves convincingly that the 1:1 copolymer (422) exhibits higher flow or lower viscosity than the pure polymers BDSDA/m-PDA and BDSDA/4,4'-ODA. This attribute is an unexpected result which makes this copolymer very attractive for fabrication procedures.

The mechanical properties of these polymers are shown in Table V. The tensile tests were performed on the extrudate from various capillary rheometer runs. All mechanical properties were determined at room temperature using an Instron Testing Machine Model TT-C.

TABLE V

| POLYMER | TENSILE PROPERTIES | | | DEGREE OF MELT FRACTURE |
|---|---|---|---|---|
| | STRENGTH, AVG. MPa | STRENGTH, RANGE MPa | MODULUS, AVG. GPa | |
| BDSDA/4,4'-ODA | — | — | — | No Flow |

TABLE V-continued

| POLYMER | TENSILE PROPERTIES | | | DEGREE OF MELT FRACTURE |
|---|---|---|---|---|
| | STRENGTH, AVG. MPa | STRENGTH, RANGE MPa | MODULUS, AVG. GPa | |
| 413 | 60.0 (8.71 ksi) | 39.1–87.9 | 1.26 (182 ksi) | High |
| 422 | 82.7 (12.0 ksi) | 72.1–92.1 | 1.48 (215 ksi) | Moderate |
| 431 | 66.7 (9.68 ksi) | 43.8–91.7 | 1.40 (204 ksi) | High |
| BDSDA/m-PDA | 85.1 (12.3 ksi) | 58.0–100.2 | 1.47 (214 ksi) | Moderate |
| BDSDA/3,3'-ODA | 30.4 (4.40 ksi) | 17.7–39.9 | 0.99 (143 ksi) | Very High |

Each value reported in Table V is the average of one polymer extruded at six different strain rates in the range 0.404–134.560 sec$^{-1}$, and the melt fracture was measured at the highest strain rate (134.560 sec$^{-1}$). Of particular note is that the 422 copolymer and the BDSDA/m-PDA polymer exhibit nearly identical tensile strengths and moduli and the variability in strength is slightly lower for the 422 copolymer. This shows that no sacrifice in mechanical properties results due to copolymerization. Also of importance is that the degree of melt fracture (undesirable) is only moderate for the 422 copolymer and the BDSDA/m-PDA. In all other cases the degree of melt fracture was higher.

Thus, copolymers of polyimides with both flexible bridging groups and meta-linkages in the diamine-derived portion of the polymer have afforded flow properties superior to either of the corresponding homopolymers. This technique and these compositions clearly lead to polyimides with unusual and unexpected flow properties and thus offer an improvement over the state-of-the-art systems.

The 422 copolymer was further evaluated as a hot-melt adhesive. The evaluation, based on lap shear strengths, involved the determination of a bonding cycle and thermal exposure.

An adhesive tape comprising a glass cloth coated with several layers of the 422 copolyimide was placed between heated and primed surfaces of two titanium adherends using a surface overlap of about 1.25cm. The assembly was placed in a bonding press and subjected to a bonding cycle comprising the steps of heating the polyimide tape under 50–500 psi pressure at a rate of about 7°–10°C./min from ambient temperature to 340°–345°C., holding the polyimide at 340°–345°C. for approximately one hour, and cooling the assembly under pressure to 120° to 160° C. The assembly was then removed from the bonding press.

Tests were then performed on bonded adherends formed in this manner to determine the effects on lap shear strengths for thermal exposure for 1000 hours at 204°C. Thermal exposure was performed in a forced air oven controlled within ±1% of exposure temperature. Lap shear tests were conducted at room temperature, 177° C., and 204° C., before (controls) and after exposure giving lap shear strengths of 35.5, 22.0 and 15.0 MPa, respectively (before exposure) and 34.0, 22.5, and 19.5 MPa, respectively (after exposure). No significant difference in lap shear strength is noted for those tested at room temperature and 177° C. for the controls and the thermally exposed specimens. A substantial increase in average lap shear strength at 204° C. was obtained for those thermally exposed at 204° C. compared to the controls. Tested specimens failed 100% cohesively except for the 204° C. control specimens which failed primarily cohesively with some adhesive type failure.

A significant increase in Tg (18° C.) was determined for the thermally exposed specimens which is a common occurrence due to further polymer cure, polymer oxidation, and/or elimination of trapped volatiles. This possibly could account for the increase in lap shear strength seen for the thermally exposed specimens tested at 204° C.

It is apparent from these tests that the polymers of the invention are useful as adhesives and that the 422 polymer has exceptional characteristics for this application.

SPECIFIC EXAMPLES

EXAMPLE I 10.2096g (0.02 moles) of 4,4'-bis(3,4-dicarboxyphenoxy) diphenylsulfide dianhydride (BDSDA), 1.0012 g (0.005 moles) of 4,4'-diaminodiphenyl ether (4,4'-ODA), and 1.6222 g (0.015 moles) of 1,3-diaminobenzene (m-PDA) were allowed to react in 51.33 g of N,N-dimethylacetamide (DMAc) at room temperature for about two hours. Molecular weight build up occurred during this time as evidenced by an increase in solution viscosity. Inherent viscosity of the solution as determined at 0.5% concentration in DMAc at 25° C. was 0.378 (Copolyimide 413).

EXAMPLE II 10.2096 g (0.02 moles) of BDSDA, 2.0024 g (0.01 moles) of 4,4'-ODA, and 1.08144 g (0.01 moles) of m-PDA were allowed to react in 53.172 g of DMAc at room temperature for two hours. The inherent viscosity was 0.441 (Copolyimide 422).

EXAMPLE III 10.2096 (0.02 moles) of BDSDA, 3.0036 g (0.015 moles) of 4,4'-ODA, and 0.54072 g (0.005 moles) of m-PDA were allowed to react in 55.01 g of DMAc at room temperature for two hours. The inherent viscosity was 0.459.

EXAMPLE IV 10.2096 g (0.02 moles) of BDSDA and 4.0048 g (0.02 moles) of 3,3'-diaminophenyl ether (3,3'-ODA) were allowed to react in 56.85 g of DMAc at room temperature for two hours. The inherent viscosity was 0.424.

EXAMPLE V 20.4192 g (0.04 moles) of BDSDA and 4.3258 g (0.04 moles) of m-PDA were allowed to react in 98.98 g of DMAc at room temperature for two hours. The inherent viscosity was 0.606.

EXAMPLE VI 5.1048 g (0.01 moles) of BDSDA and 3.2212 g (0.01 moles) of benzophenonetetracarboxylic dianhydride (BTDA) were mixed with 2.0024 g (0.01 moles) of 4,4'-ODA and 1.08144 g (0.01 moles) of m-PDA in 51 g of DMAc. This mixture was allowed to react for two hours at room temperature. The inherent viscosity was 0.890.

EXAMPLE VII 4.3624 g (0.02 moles) of pyromellitic dianhydride (PMDA), 2.0024 g (0.01 moles) of 4,4'-ODA, and 1.0814 g (0.01 moles) of m-PDA were allowed to react for twohours at room temperature in 42.16 g of DMAc. The resulting inherent viscosity was 1.058.

EXAMPLE VIII 3.2224 g (0.01 moles of BTDA, 1.0012 g (0.005 moles) of 4,4'-ODA, and 0.54072 g (0.005 moles) of m-PDA in 26.97 g of DMAc were allowed to react at room temperature for two hours. The inherent viscosity was 1.154.

EXAMPLE IX

The poly(amide-acid) solution from Example VII was cast onto a glass plate at a thickness of 0.02 inch and the solvent was allowed to evaporate. The resulting polymer film was heated for approximately one hour at about 100° C., then for approximately one hour at about 200° C. and finally for approximately one hour at about 300° C. Removal of the film from the glass plate yielded a very flexible, smooth yellow film.

EXAMPLE X

The polymer solution from Example VIII was treated as in Example IX to yield a very flexible, smooth yellow film.

EXAMPLE XI

The six polymer solutions from Examples I-VI were each separately poured into water in a blender to precipitate the polymer. In each case the solid polymer was collected via suction filtration. Each polymer was air dried at 20°-30° C. for ten to fifteen hours and then subjected to a thermal profile in an air oven for approximately one hour at about 100° C., for approximately one hour at about 200° C., and finally for approximately one hour at about 300° C. The individual polymers were chopped to a granular consistency.

EXAMPLE XII

Each polymer solid from Example XI was evaluated for flow properties by placing each one in a capillary rheometer and heating them to about 350° C. At this temperature, they were subjected to strain rates from 134.560 to 0.404 sec$^{-1}$ in order to extrude them and to measure their viscosities. Each of the six extrudates, approximately 0.17cm in diameter and 2.54 cm in gage length, was measured for its tensile properties in the direction of extrusion at a crosshead speed of 0.51 cm/min. ASTM Standard D638-82a was used as a guide, but due to lack of material, sample size was decreased from recommended ASTM size.

EXAMPLE XIII

Adhesive tape was prepared by brush-coating a 422 polyamic-acid, 20% solids solution in diglyme, $\eta_{inh}$ (inherent viscosity) of 0.789, onto 112 E-glass cloth with A-1100 finish ($\gamma$-aminopropysilane). Prior to coating, the glass cloth (tightly mounted in a metal frame) was initially oven-dried for ten minutes at 100° C. The 0.01cm thick glass cloth served as a carrier for the adhesive as well as for bondline thickness control and an escape channel for solvent. Coatings of the polymer solution were applied to the glass cloth until a thickness of 0.020-0.025cm was obtained. After a primer coat (approximately 4% solids solution) was applied, each coat application thereafter was air-dried for one-half hour, placed in a forced air oven, heated from room temperature to about 100° C., held approximately one hour at about 100° C., then heated to about 150° C., held approximately two hours at about 150° C., and then heated to about 175° C., and held approximately three hours at about 175° C. Some blistering of the polymer occurred due to the above treatment.

EXAMPLE XIV

The prepared adhesive tape (Example XIII) was used to bond titanium adherends (Ti 6A1-4V, per Mil-T-9046E, Type III Comp. C) with a nominal thickness of 0.13cm. The four-fingered Ti(6A1-4V) panels were surface treated with a Pasa-Jell 107 (trademark for a titanium surface treatment available from Semco, Glendale, California) treatment to form a stable oxide on the surface. The treated adherends were primed within one hour of the surface treatment by applying a thin coat, approximately $2.5 \times 10^{-2}$ mm of the 20% solids solution on the surface to be bonded. They were then air dried in a forced-air oven for approximately fifteen minutes at about 100° C. and approximately fifteen minutes at about 150° C. The primed adherends were stored in a polyethylene bag and placed in a desiccator until needed. Lap shear specimens were prepared by inserting the adhesive tape between the primed adherends using a 1.27 cm overlap (ASTM D-1002).

The specimens were assembled in a bonding jig in such a manner as to hold the specimens securely while being bonded. The assembly was placed in a hydraulic press and 50-500 psi pressure was applied. The temperature, which was monitored by a thermocouple spot welded next to the bondline of one of the specimens, was increased at a rate of 7°-10° C./min up to 340°-345° C. The specimens were held at 340°-345° C. and 50-500 psi for one hour. The press was then cooled to 120° to 160° C., still under pressure. The bonded specimens were thereafter removed from the press and the bonding jig and tested for lap shear strengths.

Specimens were soaked at temperature in a clamshell, quartz-lamp oven and were held at temperature for ten minutes prior to testing. Temperatures were controlled to within ±3° C. for all tests. Bonded thickness was determined as the difference between the total bonded thickness and the titanium adherend thickness. The average bondline thickness was 0.20 mm with a range of 0.12 mm to 0.24 mm.

A rather severe 72 hour water-boil test was conducted in laboratory glassware containing boiling distilled water. Lap sheap specimens were immersed above the bonded area at all times during the 72 hour period. Lap shear strengths were determined at room temperature, 177° C., and 204° C. The test produced decreased strengths at all test temperatures indicating a lack of resistance to the effects of water on the adhesive system, i.e., the adhesive and treated titanium surface. The lap shear strength values decreased by 20% at room temperature, 41% at 177° C., and 70% at 204° C. A more realistic test would be to expose the lap shear specimens to a controlled cyclic humidity condition more representative of what an adhesive system would experience during the intended application.

EXAMPLE XV 16.273 g (0.050 moles) of benzophenonetetracarboxylic dianhydride (BTDA) was slurried (at room temperature in a 1000ml cylindrical reaction flask with a removable fournecked top) with a mixture of 35g 2-methoxyethyl ether (diglyme) and 100g N,N-dimethylacetamide (DMAc). 5.006 g (0.025 moles) of 4-4'-diaminodiphenyl ether (ODA) was added and stirred for fifteen minutes when the reaction mixture became transparent due to all the materials going into solution as this initial reaction occurred. 2.704g (0.025 moles) of meta-phenylenediamine (MPD) was added and the solution stirred for an additional thirty-five minutes. The resulting polyamic-acid polymer solution was decanted from the vessel and an inherent viscosity of 0.517dl/g was obtained at 0.5% solids in DMAc. In the above reaction a small quantity of a chain stopper, e.g., phthalic anhydride or aniline (0.002 moles) could be employed to control molecular weight.

EXAMPLE XVI

Adhesive tape was prepared by brush coating a primer solution of the polyamic-acid solution of Example XV (diluted to approximately 7.5 wt/% solution in DMAc) onto 112 E-glass cloth with A-1100 finish ($\gamma$-aminopyropysilane). Prior to coating, the glass cloth (tightly mounted on a metal frame) was dried in a forced-air oven for thirty minutes. The 0.01 cm thick glass cloth served as a carrier for the adhesive as well as for bondline control and an escape channel for solvent. Coatings of the polymer solution were applied to the glass cloth until a thickness of 0.20–0.25 cm was obtained following the coating procedure defined in Example XIII. The adhesive tape as prepared was used to bond titanium adherends for determination of reasonable bonding conditions to use in further investigations. The rather involved procedure to prepare the tape was necessary to drive-off solvent and reaction product volatiles when converting the polyamic-acid to the polyimide which generally occurs above 160° C. with the degree of conversion being a function of time and temperature.

EXAMPLE XVII

The prepared adhesive tapes (Example XVI) were used to bond titanium adherends (Ti 6AL-4V, per Mil-T-9046E, Type III Comp. C) with a nominal thickness of 0.13 cm. The four-fingered Ti(6AL-4V) panels were grit blasted with 120 grit aluminum oxide, washed with methanol, and treated with a Pasa-Jell 107 (Tradename for a titanium surface treatment available from Semco, Glendale, California) treatment to form a stable oxide on the surface. The adherends were washed with water, dried in a forced-air oven at 100° C. for five minutes and primed within two hours of the surface treatment by applying a thin coat of the polyamic-acid solution of the respective adhesives on the surfaces to be bonded. They were then air dried for thirty minutes in a forced-air oven, for fifteen minutes at 100° C., and fifteen minutes at 150° C. The primed adherends were stored in a polyethylene bag and placed in a desiccator until needed. Lap shear specimens were prepared by inserting the adhesive tape between the primed adherends using a 1.27 cm overlap (ASTM D-1002) and applying 2.07 MPa pressure in a hydraulic press during the heating schedule. Bonding temperature was monitored using a type K thermocouple spot-welded to the titanium adherend at the edge of the bondline.

Several bonding cycles for the adhesive (STPI/LARC) were investigated during this study to determine a bonding process which produced good strengths. The following processing cycles were used:

Cycle 1: (1) 2.1 MPa pressure, heating rate approximately 8.2° C./min, RT→329° C.; (2) hold fifteen minutes at 329° C.; and (3) cool under pressure to approximately 150° C. and remove from bonding press.

Cycle 2: Same as Cycle 1 except RT→343° C.

Cycle 3: Same as Cycle 1 except RT→343° C., hold for one hour.

A bonding cycle was selected from the above Cycles (Cycle 3) and used to determine the effects of an additional heat treatment of the adhesive tape prior to bonding based on the lap shear strengths obtained. Based on those results, lap shear specimens were prepared for thermal exposure for 500 and 1000 hours at 204° C. Thermal exposure was performed in a forced-air oven controlled within ±1% of exposure temperature. Lap shear tests were conducted at room temperature, 177° C., and 204° C. before (controls) and after exposure giving average lap shear strengths of 22.2, 23.9 and 24.3 MPa, respectively.

SUMMARY

It can thus be seen that the present invention yields copolymers with a combination of flexible linkages that exhibit flow properties which make them particularly well suited for a wide range of applications including adhesives, molding resins, laminating resins, dielectric coating and protective coatings.

The above specific examples are considered illustrative of the invention, and there may be modifications and variations thereof that will be apparent to those skilled in the art without departing from the spirit and scope of the invention as set forth herein.

What is claimed as new and desired to be secured by Letters Patent of the United States is:

1. A copolyimide consisting essentially of chemically combined recurring units of the formula:

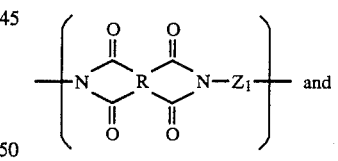 and

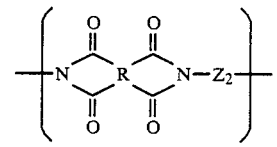

wherein R is the same or differs between said recurring units and is at least one aromatic tetravalent radical; and wherein $Z_1$ is of the formula:

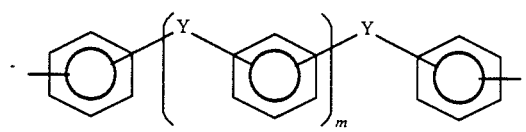

where Y is selected from the group consisting of —O—, —S—, —CO—, —SO₂—, —NH—, —SO—,

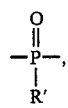

—C(CF₃)₂— and —C(CH₃)₂—, where R' is alkyl or aryl and m is 0, 1, 2 or 3; and wherein Z₂ is of the formula

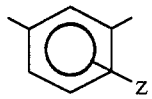

where Z is selected from the group consisting of alkyl, aryl, —Br, —Cl, —F, —CF₃—, and hydrogen.

2. A copolymide according to claim 1 wherein Z is selected from the group consisting of —Br, —Cl, —F, —I, and —CF₃.

3. A copolyimide according to claim 1 wherein R is selected from the group consisting of:

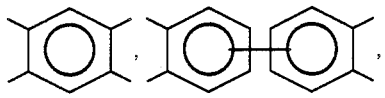

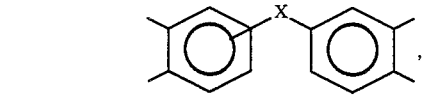

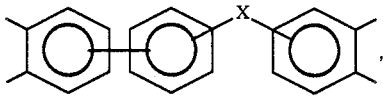

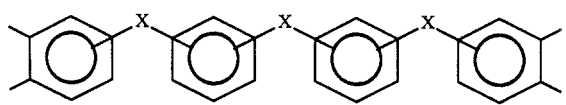

wherein X is selected from the group consisting of —O—, —S—, —CO—, —SO₂—, —NH—, —SO—, —C(CF₃)₂—, C(CH₃)₂,

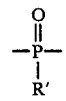

where R' is alkyl or aryl.

4. A copolymer according to claim 3 wherein Z₁ is of the formula:

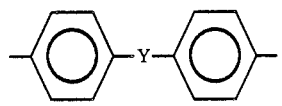

and Y is selected from the group consisting of —O—, —S—, —CO—, —SO₂—, —NH—, —SO—,

—C(CH₃)₂—, —C(CH₃)₂—, where R' is alkyl or aryl.

5. A copolymer according to claim 1 wherein R is selected from the group consisting of:

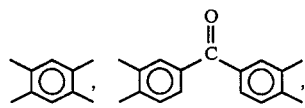

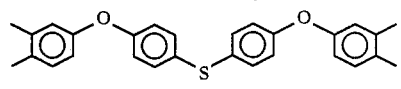

6. A copolyimide according to claim 5 wherein Z₁ is of the formula:

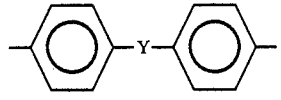

and Y is selected from the group consisting of —O—, —S—, —CO—, —SO₂—, —NH—, —SO—,

—C(CF₃)₂—, —C(CH₃)₂, where R' is alkyl or aryl.

7. A copolyimide according to claim 5 wherein Z₁ is of the formula:

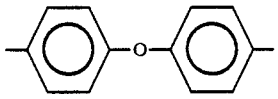

8. A copolyimide according to claim 1 of the formula:

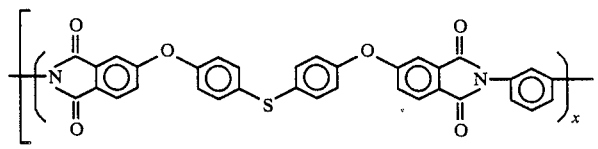

-continued

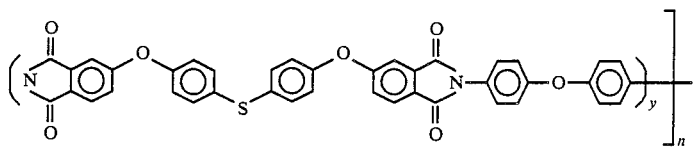

wherein the ratio x:y varies from 1:3 to 3:1 and n is 5-100.

9. A copolyimide according to claim 1 of the formula:

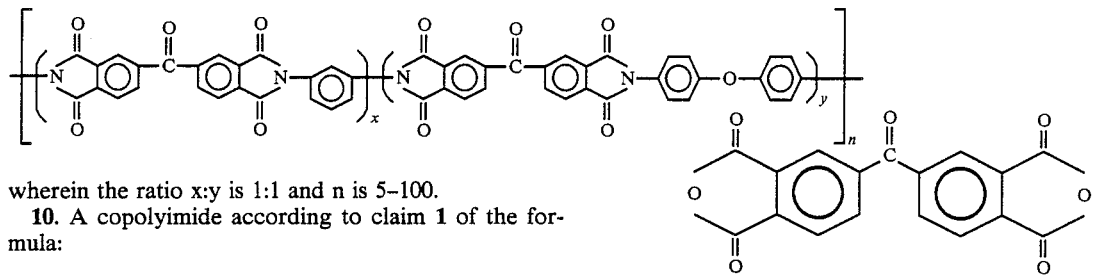

wherein the ratio x:y is 1:1 and n is 5-100.

10. A copolyimide according to claim 1 of the formula:

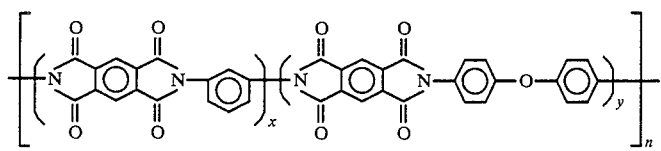

wherein the ratio x:y is 1:1 and n is 5-100.

11. A copolyimide according to claim 1 wherein R is selected from the group consisting of $R_1$, $R_2$, where $R_1$ is of the formula:

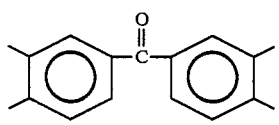

and $R_2$ is of the formula:

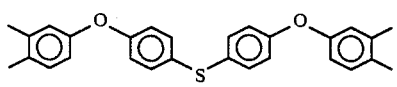

wherein $Z_1$ is of the formula

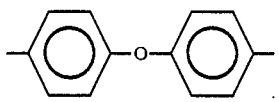

, and
wherein equimolar amounts of $R_1$, $R_2$, $Z_1$ and $Z_2$ are present.

12. The copolyimide obtained by
reacting in an inert solvent, at a temperature of 10°-30° C. about 1.0 parts by mole of an aromatic dianhydride of the formula:

and about 1.0 part by mole of an aromatic dianhydride of the formula:

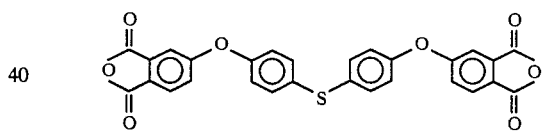

with about 1.0 part by mole of a bridged diamine of the formula:

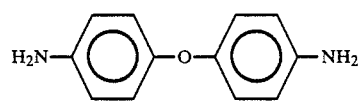

and with about 1.0 part by mole of a diamine of the formula:

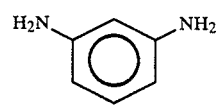

for a length of time sufficient to form a poly(amide-acid) soluble in said solvent; and
heating the resulting poly(amide-acid) from 150°-400° C. for a time sufficient to form a polyimide.

* * * * *